United States Patent Office 3,216,826
Patented Nov. 9, 1965

3,216,826
METHOD OF PROCESSING A SOLID MEAT MASS
Claude J. Wattenbarger, Dalton, Ill.
No Drawing. Filed Sept. 26, 1960, Ser. No. 58,153
11 Claims. (Cl. 99—107)

The present invention relates in general to meat having new properties or characteristics and to the method of preparing such a product. More specifically my invention is directed to a solid meat mass having a modified internal structure, to the method of preparing such a meat mass, and to an improved method for distributing a nonmeat ingredient throughout a substantially solid meat mass.

Historically meat has been treated in numerous ways. It has been salted, cured, flavored, tenderized, frozen, dried, chilled, smoked, preserved, etc., with the net result of such treatment being enhancement of keeping qualities, flavor, tenderness, color, and the like. The method of treating the meat has evolved from such procedures as spreading in the sun, burial in the ground, immersion in mineral water, etc., to the more improved methods of rubbing an additive, dry or liquid, onto the surface of the meat and allowing time for penetration.

The major problem in all such treating methods is the difficulty in effecting satisfactory distribution of the treating substance. An additional problem is in the extension period of time that is often required to allow penetration of the treating substance before the meat can be further processed.

The problem of distribution has been improved by methods which utilize the vascular system of the meat-bearing animal to carry the additive. However, a heavier concentration of the treating substance may occur in the larger vessels, resulting in a non-uniform distribution of the substance. In addition, time for diffusion from the veins into the tissues is required and the types of additives adaptable to this method of handling are limited. Furthermore, the handling of large pieces of meat in this manner is accompanied by an increase in processing time and labor. Apart from the above considerations it is, of course, apparent that this system breaks down if the vascular system has previously been severed or is ruptured during the treatment. Another improvement is in the method of pumping fluid additives at a plurality of points into the meat tissue under pressure, a procedure known as stitch pumping. Here again, time must be allowed for diffusion of the treating substance outwardly from the path of the needle into the meat tissue. While steps in the right direction, these improved methods of treating have not completely solved the problem. Whether dipping, soaking, vein pumping or stitch pumping is employed, substantial time is required for distribution of the treating material. This period may extend from several hours to several weeks depending on the method used.

It is therefore a principal object of my invention to provide a method of treating meat wherein desired additives can be introduced and substantially immediately distributed throughout the meat.

Another problem that arises in certain of the conventional methods for incorporating a treating substance in meat is the lack of uniformity of distribution, with the probability of localized excessive concentration of the additive. If, in this situation, sufficient additive and distribution time is utilized to obtain distribution throughout, although nonuniform, the additional economic problem of using larger amounts of additive than would theoretically be required for the desired effect will also exist. Incorporating sufficient additive to obtain thorough distribution under conventional methods may also effect a sufficiently excessive weight gain in the meat to be disadvantageous or even prohibited by law. This possibility requires that careful control be maintained.

An additional object of my invention is to provide a method wherein additives can be substantially uniformly incorporated into a solid meat mass without localized excessive concentration of the additive. My method, therefore, allows use of substantially only the amount of additive required to effect the desired result. In addition, when following my method, it is possible to simply and accurately control weight gain in the meat.

A further difficulty with conventional meat treating methods is their inflexibility with respect to the type of additive. Many systems can only distribute liquid; most cannot distribute a solid or gas unless they are dissolved in a liquid or will dissolve, with time, in either the water or fat phase of the meat itself. It is another object of my invention to provide a method for dispersing additives substantially uniformly throughout relatively large masses of solid meat regardless of whether these additives be gases, liquids, solids, or mixtures of these, or whether soluble or insoluble in a carrier or the meat itself.

A still further object of my invention is to provide a substantially solid meat mass having a modified tissue structure internally of the surface thereof.

An additional object is to provide a solid meat mass which will dehydrate, rehydrate, and/or cook more rapidly than untreated solid meat.

Another object is to provide a method for modifying the internal tissue structure of a mass of uncomminuted meat.

A further object of my invention is to provide an improved method of distributing a meat tenderizing substance throughout a substantially solid mass of meat.

Further objects and advantages will become apparent to one skilled in the art from the following description of my invention.

I have discovered that the incorporation of a pressurized gas into solid meat provides a product having new properties or characteristics. I have further discovered that a novel product modified by or with a nonmeat ingredient is produced when such nonmeat ingredient is incorporated into the solid meat along with or subsequent to the incorporation of a pressurized gas or when the gas itself has meat modification properties.

The gases that are useful in my invention are any gases that are nontoxic in the concentration used and are noncondensable under the temperature and pressure conditions which exist during incorporation of the pressurized, or compressed, gas into the solid meat mass. Both reactive and unreactive gases or mixtures of these can be used. Examples of gases that can be used either alone or in combination include, but are not limited to, air, carbon dioxide, oxygen, Freons, nitric oxides, nitrogen, and helium or other inert gases. For most purposes, I prefer that at least the major amount of the pressurized gas incorporated be air, nitrogen or other substantially unreactive gas. In certain instances, however, reactive gases alone or in combination are useful.

For example, if I desire to lower pH, carbon dioxide may be advantageously used alone or in combination with one or more of the other gases. Should a cured product be desired, an amount of nitric oxide sufficient to substantially cure the meat can be used along with one or more other gases. Oxygen, either alone or in combination, can be used to develop a bright red color in meat.

I have found that when a pressurized gas or mixture of gases is injected into a substantially solid meat mass, the gas separates the muscle fibers and septa and an open, or porous, tissue structure results internally of the outer surface, or perimeter, of the meat. This occurrence was surprising since pressurized gas introduced into a solid mass such as uncomminuted meat would be expected to escape to an area of lower pressure, such as the needle opening or a meat seam. Instead of this, a substantially uniform open and expanded texture is formed internally of the substantially continuous outer perimeter. The injection pressure and time of injection vary inversely with each other in this application. I therefore, correlate the two factors so that given any constant time for injection, the injection pressure on the gas will be sufficient to allow it to form the desired porous internal structure and will be insufficient to rupture the substantially continuous perimeter of the meat. As will be readily understood, the size of the metal mass will also be taken into consideration in this regard. For practical purposes, I have found injection pressures of 20–100 p.s.i. for about 0.1 to 5 seconds to be preferred, although pressures as low as 5 p.s.i. can be utilized and much higher pressures can be utilized providing the perimeter of the meat mass is not thereby ruptured. For example, an instantaneously applied jet of gas at 3,000 p.s.i. pressure opens the structure of fully chilled solid meat for a distance of about 4–5 inches.

I have found that the most desirable degree of porosity in the internal meat structure is usually attained after addition of about 10% to about 20% by volume of the pressurized gas. However, advantages will be gained, though perhaps to a lesser degree, if less gas is added and the volume can be increased to any desired higher percentage that will not rupture the outer meat surface.

The solid meat mass treated solely with a pressurized gas to possess a porous internal structure is eminently suited to be dehydrated in that condition. I have found that the so treated meat can be dehydrated as, for example, by freeze-drying while maintaining the porous structure, in from 20–30% less time than a similar sized untreated meat mass. In addition, the dehydrated meat can be rehydrated in a shorter period of time, again, as much as a 30% shorter period and rehydrates more completely. The pressurized gas treated meat can also be frozen prior to collapse of the porous structure and thereafter cut and packaged in consumer cuts. Such a product can be thoroughly cooked in less time (as much as 25–30% less time) than is conventionally required for the meat cut being handled. From the foregoing, it is apparent that it is often desirable to maintain the porous structure of the meat during further processing. However, it is to be understood that the advantages of relatively uniform and rapid distribution of a meat modifying agent that are gained by the addition of reactive gases alone or in combination with a carrier gas or, as hereinafter discussed, when other nonmeat ingredients are added by my method, will be realized even if the expanded and porous texture is not thereafter maintained.

Other nonmeat ingredients can also be incorporated into a solid meat mass by following my novel and inventive concept. For example, liquids or solids (preferably but not necessarily finely powdered) or mixtures of these, alone or in a gas carrier, can be incorporated within the pores of the open tissue structure. In incorporating such other ingredients, I prefer to inject a first portion of a pressurized gas to at least initiate the formation of the internal porous tissue structure and to then fog, atomize or otherwise disperse the other nonmeat ingredients into a second portion of pressurized gas (either the same or another gas or mixture of gases) and inject the dispersion into the solid meat mass. However, it will be understood that other means for filling the porous structure with the nonmeat ingredients are within the scope of my invention. For example, all of the pressurized gas may be injected and then all of the other ingredients (this has the effect of forming the dispersion within the meat) or a dispersion in a gas of liquid or solid or mixture thereof may be prepared and injected without an initial injection of pressurized gas. By following my improved method, meat products are prepared which are modified substantially uniformly throughout and the requirement of time for diffusion into the meat tissue is substantially eliminated.

Examples of the nonmeat ingredients other than the reactive and unreactive gases that are suitable for incorporation into a solid meat mass by my method include, but are not limited to, materials, nontoxic in the amounts used, such as: curing materials, flavoring materials, tenderizing agents, preservatives, color developers and/or stabilizers and the like. Specific ingredients that are eminently suitable include monovalent metallic chlorides said as sodium chloride; and potassium chloride; sugars; spices; monosodium glutamate; other flavorings (liquid or solid); smoke (per se or liquid smoking materials); enzyme preparations; for example solutions of proteolytic enzymes such as papain, ficin, bromelin, etc.; antioxidants, such as propyl gallate, butylated hydroxyanisole, butylated hydroxytoluene; nitrate and nitrite salts; ascorbic acid; niacin; antibiotics; moldicides; etc. The desired amounts of any of these meat modifying ingredients can be predetermined and, due to the method of incorporation, this desired amount can be distributed throughout the solid meat mass without causing localized excessive concentrations in certain areas of the meat mass and with substantially exact control of weight gain. The presence within the pores formed in the solid meat mass of these nonmeat ingredients other than gases tends to maintain the porous structure at least to a limited degree. If this degree of maintenance of the porous structure is not sufficient in any particular application, the meat mass can be frozen at least sufficiently to form a surface crust on the mass to keep the open, expanded, internal structure. In certain cases, for example when injecting enzyme solutions, it may be desirable to freeze the mass due to the nature of the ingredients incorporated.

As a means of dispersing the treating material into a pressurized gas I preferably introduce the material, e.g., a liquid, from a liquid supply means into the gas stream as that stream passes toward the discharge end of an injection needle. The equipment consists of two concentric tubes; the inner tube carrying the liquid, the outer tube carrying the gas. It will be understood that a pressure differential must exist in order to disperse the material; that is, the liquid must be under a somewhat higher pressure, e.g., usually about 2–10 p.s.i. higher, than the gas. The size of the orifice feeding the liquid into the gas can be varied over a wide range. However, the larger the orifice the smaller the pressure requirement to deliver liquid at the same rate. Other dispersing systems known to the art can be utilized. Examples are the aspirator, air ejector and air injector pumps.

A single supply needle is sufficient for some purposes; however, there are obvious advantages in having a plurality of needles operable together to inject the pressurized gas, with or without a dispersed material therein. I prefer a system having 5–7 needles operating together. Whether used individually or severally through a manifold arrangement, the needles are hollow perforated tubes. While the tip may be perforated, I prefer that the end be closed so as to avoid plugging the needle with meat tissue or fat as it is operating. It is also feasible to have multiple openings throughout the length of the needle. However, I have found that more uniform distribution is achieved if the needle openings are in a single plane normal to the vertical axis of the needles. For example, four openings spaced 90° apart around the needle circumference a small distance from the end of the needle are especially effective for good distribution. The needle should provide a tapered blunt point so that it penetrates between muscle fibers of the meat rather than cutting through them. Such a structure makes possible insertion and withdrawal of the needle without leaving permanent perforations within the meat so treated. Thus, even after treatment wherein a porous internal tissue structure is formed, the outer surface of the meat will remain a substantially continuous entity.

The following examples are presented to illustrate my invention only and are not intended to limit the scope thereof.

EXAMPLE I

Three mutton legs were stitch pumped with 5 ml. of a green dye solution at pressures of 20, 25 and 30 p.s.i. Three similarly sized mutton legs were injected as follows: compressed air was fed to a tapered injection needle and sprayed into the mutton legs on the downward stroke of the needle into the meat mass. On the upward stroke a 1% aqueous green dye solution was metered from a liquid supply and 5 ml. thereof dispersed into the air and the dispersion injected into the meat. The injection pressures were also 20, 25, and 30 p.s.i. The following penetration measurements were made, showing the improved distribution to be obtained when following my invention:

*Table I*

| Pressure, p.s.i. | Distance of penetration from needle site, inches | |
|---|---|---|
| | Stitch pumping | Pressurized gas injection |
| 20 | ⅜ | 1 |
| 25 | ⅝ | 1½ |
| 30 | 1 | 1¾ |

Samples of each of the treated mutton legs were frozen and slices were made so as to view the internal meat structure. The slices made from the stitch pumped meat were not observably changed in internal structure over untreated meat. The mutton legs injected with pressurized gas were noticebly expanded in size although the outer perimeter was substantially continuous. Slices from these mutton legs showed that the network of muscle fibers had been opened, resulting in a porous internal structure which was substantially uniform over the penetration area.

EXAMPLE II

A four pound canner and cutter grade rib eye was cut into four equal sections. Section 1 was frozen immediately as a control. Sections 2–4 were treated with 2, 3, 4, 6 and 6.9 grams per pound of a tenderizing solution containing salt, sugar, hydrolyzed vegetable protein and papain. The solution was injected by means of a modified paint spray type gun having an elongated needle instead of a paint spray nozzle, which device injected a dispersion of the tenderizing solution in nitrogen. Pressure on the propelling gas as it left the needle was approximately 20 p.s.i. Sections 2–4 were frozen substantially immediately after injection. Steaks were cut from the four sections, cooked, and graded by a panel as to tenderness and texture on the arbitrary scale from 1–10, as follows:

| 10 | Excellent. |
|---|---|
| 7–9 | Good. |
| 4–6 | Fair. |
| 3 | Poor. |
| 2 | Very poor. |
| 1 | Unsatisfactory. |

The results were as follows:

*Table II*

| Section | Amount ingredient, gm./lb. | Tenderness | Texture |
|---|---|---|---|
| 1 | 0 | 5.3 | 9.2 |
| 2 | 2.3 | 6.1 | 8.8 |
| 3 | 4.6 | 7.7 | 8.7 |
| 4 | 6.9 | 8.0 | 8.8 |

EXAMPLE III

A commercial grade beef bottom round was divided into two sections. One section was used as a control. The second section was treated with tenderizing solution of the formulation set out in Example II and injected into the meat at the rate of 9.0 grams per pound. The injection was made as follows: With nitrogen gas set at a pressure of 40 p.s.i. passing through the needle, the needle was inserted completely through the meat mass. Liquid feed was then introduced into the gas stream and the needle was withdrawn slowly, thus depositing the atomized droplets of tenderizing solution along the path of the needle into the pores formed by the gas injection on the downward needle stroke. This procedure was repeated at the rate of one insertion per square inch until one entire surface had been injected. Substantially immediately after injection thorough and substantially uniform distribution was achieved.

Steaks cut from the treated section were considered good for tenderness and texture, while steaks from the untreated section were tough and stringy.

EXAMPLE IV

Four 1¼" steaks were cut from a commercial grade of boneless sirlon strip. Two of the steaks were immediately frozen and served as controls. The other two were dipped in a commercially available enzyme preparation according to manufacturer's instructions (1 part enzyme preparation diluted with 1 part water; treatment until weight gain of about 3%).

Four additional similar sized steaks were cut from the remaining portion of the strip. Two were stitch pumped with the enzyme solution to distribute the solution thoroughly. Weight gain was 8%. The last two were treated by the procedure set out in Example III except that the pressure from the needle was at 100 p.s.i. allowing for a lesser number of injection sites. Injection proceeded until the weight had been increased by 2%. Although the amount of enzyme solution utilized in a given instance is variable depending upon the concentration of the solution and the activity of the enzyme, it is possible to obtain desirable results by introducing about 1–3% by weight of the enzyme solution into the means mass.

Averages of panel scores on the cooked steaks, according to the rating scale set out in Example II, are as follows:

*Table III*

| Treatment | Tenderness | Texture | Comments |
|---|---|---|---|
| Control | 4.3 | 9.1 | Tough. |
| Dipped | 6.2 | 5.6 | Surface mealiness. |
| Stitch pumped | 7.9 | 3.1 | Mushy pockets. |
| Pressurized gas-atomized liquid | 7.8 | 8.8 | No localized over-tenderization. |

EXAMPLE V

A gaseous mixture of 95% nitrogen and 5% nitric oxide was injected by needle into fresh whole pieces of pork. The gas was pressurized to the extent of 40 p.s.i. out of the needle. Approximately 10% gas, by volume of the meat, was injected. The treated pork was divided into four sections, and treated immediately as follows: Section 1 was pan fried. Section 2 was dry heat roasted. Section 3 was soaked in 180° F. water. Section 4 was wrapped and stored in a 40° F. cooler for two days. All sections exhibited uniform typical reddish-pink color of cured pork.

EXAMPLE VI

A commercial liquid smoke was spray injected according to the method of my invention into an uncooked piece of cured pork at the rate of 0.22 gram per pound of meat. The propellant gas was nitrogen, set at 40 p.s.i. pressure and the needle was inserted 1.3 times per sq. in. of one surface. The meat was immediately cut into slices and pan fried. Each piece had a uniform smoked flavor.

EXAMPLE VII 40 grams of a 5% aqueous solution of sodium nicotinate (sodium salt of niacin) was dispersed in air and injected at 100 p.s.i. pressure into 2082 grams of fresh beef round. Steaks were cut and it was noted that the porous internal structure was substantially uniform throughout. The steaks were then vacuum packaged. A cherry red color developed due to the reaction of niacin on the meat pigment. The color was maintained for a period of two weeks.

EXAMPLE VIII

A muscle of a mutton leg was injected with air at 40 p.s.i., via a moving needle with openings located near its point to open up the meat tissue structure. The air was turned off and the connection between the needle and air lead was broken. A small amount of dry powdered FDC Blue No. 2 dye was inserted into the needle. The air lead was reconnected to the needle, and the pressure was set at 20 p.s.i. The needle containing the dye was slowly withdrawn from the meat. The meat was frozen immediately in a −35° F. plate freezer, and was subsequently examined for dye penetration. A core about 1½" long, and approximate 1" in diameter which was thoroughly impregnated with blue specks was found along the path of the needle.

EXAMPLE IX

Four one-inch steaks were divided into two equal groups. One group acted as a control; the other was enzyme injected by the procedure of Example III. One of each group was then frozen. The other two steaks were cooked at the time-temperature schedule recommended for steaks to reach a medium rare state. The steaks were examined and it was found that the control steak was medium rare and the injected steak was well done. The frozen steaks were then placed in a 550° F. broiler. Six minutes per side were required to cook the control steak to a medium well done state. The same degree of doneness was obtained in the injected steak after four minutes cooking per side.

EXAMPLE X

A commercial grade beef rib eye was cut into two equal parts. One part was wrapped in polyethylene film and frozen as a control. The second part was injected with carbon dioxide at a pressure of 45 p.s.i. via a moving needle with openings near its tip. Injection was continued until the meat had expanded to about half again its original size. The perimeter of the meat remained substantially continuous. This section was then wrapped in polyethylene film and frozen. Four steaks (3 cm. thick) were cut from each section and dehydrated by freeze dehydration procedure. The comparative dehydration time, rehydration time, and degree of rehydration are summarized as follows:

*Table IV*

|  | Control (4 steaks) | Gas Injected (4 steaks) |
|---|---|---|
| Original weight | 723 gm | 741 gm |
| Dehydration time | 18 hr. 38 min | 13 hr. 22 min |
| Dehydration weight | 202.5 gm | 207.3 gm |
| Rehydration time (in 180° F. water) | 5 min | 5 min |
| Rehydration weight (cooked product) | 408.3 gm | 539.6 gm |

The above steaks were compared for flavor, tenderness and amount of juice by a panel of five members. Each of the panel members rated the injected product superior in each respect to the control.

As previously pointed out, several effects can be achieved in a single operation when following my invention. The following is an example of simultaneously developing color and tenderness in the meat.

EXAMPLE XI

A commercial grade sirloin butt was divided into two sections. One section was treated with a proteolytic enzyme solution using oxygen at 40 p.s.i. pressure as the impelling gas. Needle insertions were made at one inch intervals on one surface. Both the treated and nontreated samples were immediately frozen. After freezing the sections were cut into steaks and examined by a panel of beef experts. It was agreed that the treated steaks had a more desirable bright red color, substantially uniformly throughout, than did the untreated steaks. Again the expanded, porous tissue structure was noted. After broiling a taste panel graded the treated steaks as good for tenderness while the untreated steaks were graded poor.

I have used the term "meat" throughout this application to refer to the flesh of meat-bearing animals, including domesticated quadrupeds, fish and fowl. The meat may be at any temperature at which it is not frozen. By solid meat I intend to include meat which is not comminuted, such as carcass or primal cuts, and including relatively large masses such as quarters, rounds, loins, etc.

Obviously many modifications and variations of the invention as hereinbefore set forth may be made without departing from the spirit and scope thereof and therefore only such limitations should be imposed as are indicated in the appended claims.

I claim:

1. The method of processing a solid meat mass which comprises: incorporating pressurized gas which is nontoxic in the concentration used into said meat mass whereby to form an expanded internal tissue structure, and maintaining the expanded volume of said internal structure.

2. The method of processing a solid meat mass which comprises: injecting pressurized gas which is nontoxic in the concentration used into said meat mass whereby to separate the muscle fibers and septa and expand the tissue structure, and freezing said injected mass prior to collapse of said expanded structure.

3. The method of processing a solid meat mass which comprises: injecting pressurized gas which is nontoxic in the concentration used into said meat mass whereby to form an open expanded tissue structure internally of the substantially continuous perimeter of said mass, said structure providing a plurality of pores within said meat mass; an injecting a nontoxic non-meat ingredient into said meat mass, said ingredient substantially entering said pores and being selected from the group consisting of liquids, solids and mixtures thereof.

4. The method of claim 3 wherein said non-meat ingredient is a dispersion of a meat tenderizing agent in a pressurized gas.

5. The method of processing a solid meat mass which comprises: injecting non-toxic pressurized gas into said meat mass whereby to separate the muscle fibers and septa and form an open expanded tissue structure internally of the substantially continuous perimeter of said mass, said structure providing a plurality of pores within said meat mass; injecting a meat tenderizing agent into said meat mass, said agent substantially entering said pores; and thereafter freezing said injected mass prior to collapse of said expanded structure.

6. The method of incorporating a nontoxic non-meat ingredient into a solid meat mass and expanding the same which comprises: injecting a first portion of a pressurized gas into said meat mass whereby the muscle fibers and septa in the meat are separated and expanded, said injection being at a pressure insufficient to rupture the substantially continuous perimeter of said meat mass; dispersing said non-meat ingredient in a second portion of said pressurized gas; and injecting said dispersion into said expanded meat mass.

7. The method of accelerating distribution of a non-toxic non-meat ingredient throughout a solid meat mass and expanding the same which comprises: injecting a first portion of a non-toxic pressurized gas into said meat mass at a plurality of zones whereby to form an expanded tissue structure internally of the substantially continuous perimeter of said meat mass, and incorporating a dispersion of said non-meat ingredient and a non-toxic pressurized gas in said expanded tissue structure.

8. The method of obtaining substantially immediate distribution of a proteolytic enzyme solution throughout a solid meat-mass and expanding the same which comprises: injecting a first portion of a non-toxic pressurized gas into said meat mass at a plurality of zones whereby to separate the muscle fibers and septa in the meat and form an expanded tissue structure substantially throughout said mass internally of the substantially continuous perimeter of said meat mass; dispersing said enzyme solution in a second portion of said pressurized gas; and injecting said dispersion into said expanded meat mass whereby said dispersion will substantially occupy the pores of said expanded structure.

9. The method of obtaining substantially immediate distribution of a proteolytic enzyme solution substantially uniformly throughout a solid meat mass which comprises: injecting a first portion of pressurized nitrogen gas into said meat mass at a plurality of zones whereby to form an open expanded tissue structure substantially throughout said mass internally of the substantially continuous perimeter of said mass; dispersing a predetermined amount by weight of the meat mass of said enzyme solution in a second portion of said pressurized nitrogen gas; and injecting said dispersion into said meat mass whereby to fill at least the open tissue structure with said dispersion.

10. The method of claim 9 wherein at least about 10% by volume, of nitrogen gas is injected into said meat mass.

11. The method of claim 9 wherein from about 10% to about 20%, by volume, nitrogen gas and about 1–30% by weight, enzyme solution is injected into said meat mass, and said injections are under a pressure of between about 20–100 p.s.i.

References Cited by the Examiner
UNITED STATES PATENTS

| | | | |
|---|---|---|---|
| 1,557,779 | 10/25 | Scheib | 99—159 |
| 2,241,030 | 5/41 | Hess | 99—159 |
| 2,629,311 | 2/53 | Graves | 99—159 |
| 2,688,556 | 9/54 | Komarik et al. | 99—159 X |
| 2,805,163 | 9/57 | Williams et al. | |
| 2,854,342 | 9/58 | Komarik | 99—159 |
| 2,857,284 | 10/58 | York | 99—159 X |
| 2,930,703 | 3/60 | Harper | 99—159 |
| 3,006,768 | 10/61 | Williams | 99—107 |

A. LOUIS MONACELL, *Primary Examiner.*

ABRAHAM H. WINKELSTEIN, HYMAN LORD,
*Examiners.*